(12) United States Patent
Galwas (10) Patent No.: US 9,369,459 B2
(45) Date of Patent: Jun. 14, 2016

(54) METHOD OF ESTABLISHING SECURE GROUPS OF TRUSTED CONTACTS WITH ACCESS RIGHTS IN A SECURE COMMUNICATION SYSTEM

(75) Inventor: Paul Anthony Galwas, St Ives (GB)

(73) Assignee: CELLCRYPT GROUP LIMITED, Grand Cayman (KY)

( * ) Notice: Subject to any disclaimer, the term of this patent is extended or adjusted under 35 U.S.C. 154(b) by 0 days.

(21) Appl. No.: 13/977,068

(22) PCT Filed: Dec. 29, 2011

(86) PCT No.: PCT/US2011/067700
§ 371 (c)(1),
(2), (4) Date: Feb. 10, 2014

(87) PCT Pub. No.: WO2012/092410
PCT Pub. Date: Jul. 5, 2012

(65) Prior Publication Data
US 2014/0150074 A1    May 29, 2014

Related U.S. Application Data

(60) Provisional application No. 61/428,586, filed on Dec. 30, 2010.

(51) Int. Cl.
*H04L 29/06* (2006.01)
*G06F 21/33* (2013.01)
*H04L 9/32* (2006.01)
*H04W 4/08* (2009.01)
*H04L 29/12* (2006.01)

(52) U.S. Cl.
CPC ............ *H04L 63/0823* (2013.01); *G06F 21/33* (2013.01); *H04L 9/3263* (2013.01); *H04L 63/065* (2013.01); *H04L 63/104* (2013.01); *H04W 4/08* (2013.01); *H04L 61/1529* (2013.01)

(58) Field of Classification Search
None
See application file for complete search history.

(56) References Cited

U.S. PATENT DOCUMENTS

| | | | |
|---|---|---|---|
| 5,748,736 | A | 5/1998 | Mittra |
| 2002/0150091 | A1 | 10/2002 | Lopponen et al. |
| 2002/0184310 | A1 | 12/2002 | Traversat et al. |

(Continued)

FOREIGN PATENT DOCUMENTS

| | | |
|---|---|---|
| EP | 1 912 394 A1 | 4/2008 |
| WO | 2005 120112 A1 | 12/2005 |

OTHER PUBLICATIONS

International Search Report with Written Opinion for PCT International Patent Application No. PCT/US2011/067700, May 3, 2012.

(Continued)

*Primary Examiner* — David Pearson
(74) *Attorney, Agent, or Firm* — RatnerPrestia (57) ABSTRACT

A method of establishing secure groups of trusted contacts with access rights in a secure communication system. The method includes establishing secure groups of trusted contacts in the secure communication system; storing information corresponding to the trusted contacts of a secure group as a secure group in a database; and determining access rights of the secure group and storing the access rights in the database with the stored information corresponding to the secure group.

16 Claims, 3 Drawing Sheets

(56) References Cited

U.S. PATENT DOCUMENTS

2003/0188167 A1* 10/2003 Kurosaki et al. .............. 713/176
2006/0031510 A1* 2/2006 Beck et al. ................... 709/226
2006/0077952 A1 4/2006 Kubsch et al.
2006/0282889 A1* 12/2006 Brown et al. ................... 726/15
2007/0073874 A1* 3/2007 Moghaddam ..... G06F 17/30867
         709/224
2007/0077917 A1* 4/2007 Kim ..................... H04L 12/585
         455/411
2009/0094671 A1* 4/2009 Kurapati ............. H04L 63/1458
         726/1

OTHER PUBLICATIONS

Supplementary European Search Report issued in EP 11 85 2249 dated Mar. 12, 2015.

EPO Office Action issued in EP 11 852 249.9-1870 dated Feb. 22, 2016.

* cited by examiner

FIG. 1

| | | NAME | CALLING ID | PEER ID | CREDENTIAL$_1$ (n) | ACCESS RIGHTS (1) |
|---|---|---|---|---|---|---|
| | TRUSTED CONTACT$_1$ | | | | | |
| SECURE GROUP 1 | ⋮ | ⋮ | ⋮ | | | |
| | TRUSTED CONTACT$_n$ | NAME$_n$ | CALLING ID$_n$ | PEER ID$_n$ | CREDENTIAL$_n$ (n) | ACCESS RIGHTS (n) |
| | TRUSTED CONTACT$_1$ | NAME$_1$ | CALLING ID$_1$ | PEER ID$_1$ | CREDENTIAL$_1$ (n) | ACCESS RIGHTS (1) |
| SECURE GROUP 2 | ⋮ | ⋮ | ⋮ | | | |
| | TRUSTED CONTACT$_n$ | NAME$_n$ | CALLING ID$_n$ | PEER ID$_n$ | CREDENTIAL$_n$ (n) | ACCESS RIGHTS (n) |
| | TRUSTED CONTACT$_1$ | NAME$_1$ | CALLING ID$_1$ | PEER ID$_1$ | CREDENTIAL$_1$ (n) | ACCESS RIGHTS (n) |
| SECURE GROUP n | ⋮ | ⋮ | ⋮ | ⋮ | ⋮ | ⋮ |
| | TRUSTED CONTACT$_n$ | ⋮ | ⋮ | ⋮ | ⋮ | ⋮ |

FIG. 2A

| SECURE GROUP ID (1) | GROUP CERTIFICATE (1) | ACCESS RIGHTS (1) |
|---|---|---|
| ⋮ | ⋮ | ⋮ |
| ⋮ | ⋮ | ⋮ |
| SECURE GROUP ID (n) | GROUP CERTIFICATE (n) | ACCESS RIGHTS (n) |

METHOD OF ESTABLISHING SECURE GROUPS OF TRUSTED CONTACTS WITH ACCESS RIGHTS IN A SECURE COMMUNICATION SYSTEM

FIELD OF THE INVENTION

The present disclosure relates to providing voice and other real-time communications of digital data over networks. In particular, the present disclosure relates to establishing secure groups of trusted contacts between end points in a secure communication system.

BACKGROUND OF THE INVENTION

In network systems, such as mobile telephony, it is important to perform protocols that establish secure real-time communication of data over a network. There is an established field of real-time communications over Internet Protocol (IP) networks, which underpins widespread applications such as Voice over IP (VoIP). There are standard protocols such as Session Initiation Protocol (SIP) and Real-Time Transport Protocol (RTP) which support unencrypted real-time traffic. Secure RTP (SRTP) has been extended to encrypt real-time traffic. However, none of these protocols consider establishing a community of secure groups of trusted contacts to further provide secure communications.

The present disclosure is directed toward, but not limited toward, improving the above noted problems by establishing secure groups of trusted contacts in a secure communication system.

SUMMARY OF THE INVENTION

Exemplary embodiments disclosed herein provide a method of establishing secure groups of trusted contacts with access rights in a secure communication system. The method, for example, includes establishing, by an end point, secure groups of trusted contacts in the secure communication system; storing information, by a database manager, corresponding to trusted contacts of a secure group, as a secure group in a database; and determining access rights, by the end point, of the secure group and storing the access rights in the database with the stored information corresponding to the secure group.

Exemplary embodiments also provide a method of communicating in a secure communication system with secure groups of trusted contacts and access rights, the method includes, for example, initiating a desired operation to another end point in the communication system; checking a database of secure groups to verify whether the name associated with the other end point is listed in the database; checking the access rights associated with the secure group of the other end point if the name of the end point is listed in the database; determining whether permission is granted to perform the desired operation from the associated access rights; and performing the desired operation if permission is granted to perform the desired operation.

DETAILED DESCRIPTION

The present disclosure describes a communication protocol for providing secure real-time communications in a network system. The protocol is bandwidth efficient and uses minimal data and messages to effectuate secure real time communications in the network. The protocol performs mutual authentication and generates multiple shared secrets for encrypted communications.

Figure 1:
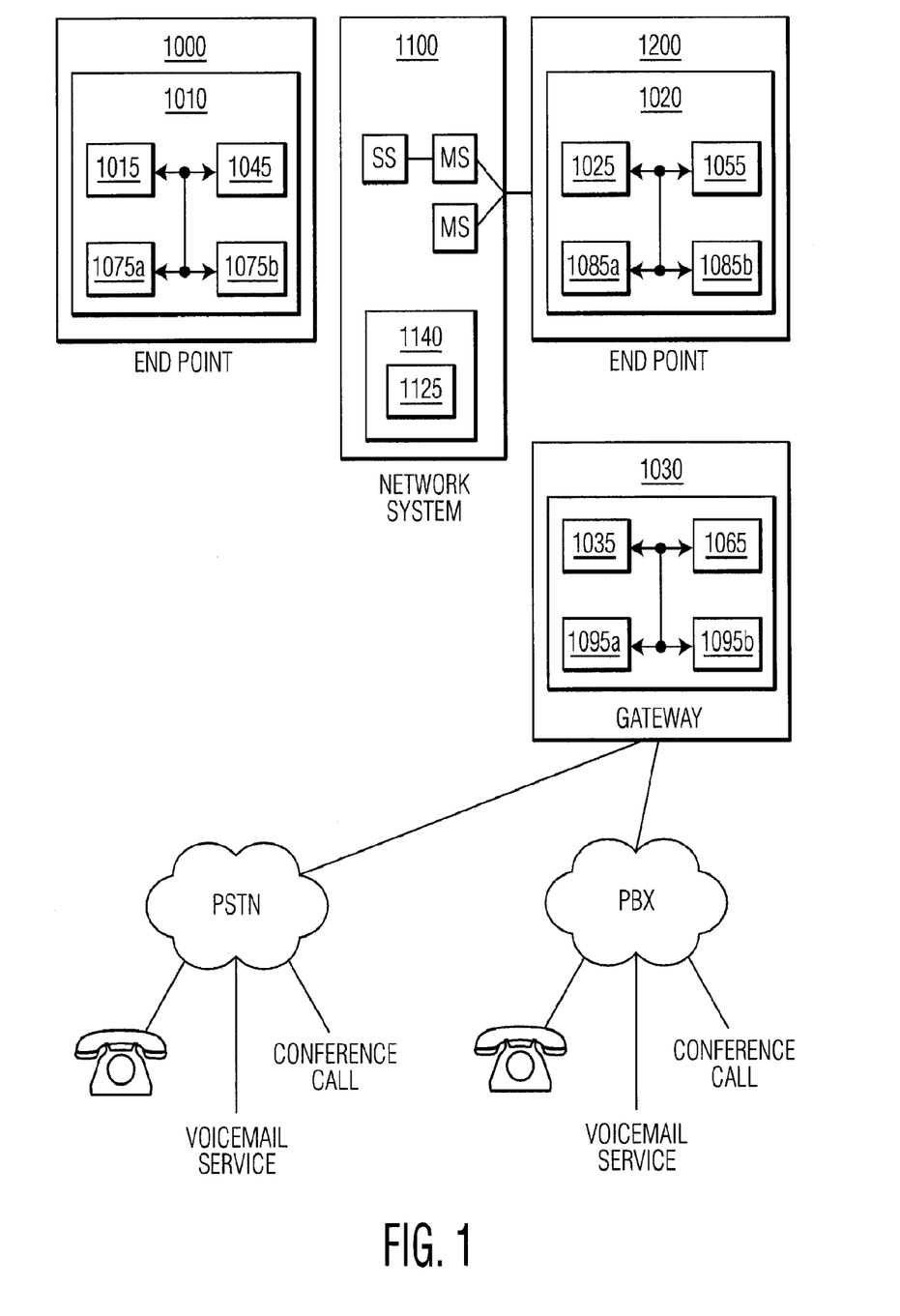
FIG. 1 is a block diagram illustrating an exemplary embodiment of a communication system as disclosed herein.

FIG. 1 is a diagram illustrating an exemplary embodiment of a communication system. The system includes end point 1010 communicating over wireless network 1000 with network system 1100, and end point 1020 communicating with the network system over wireless network 1200. The network system interconnects two end points in the communication system, and the communication system may include two or more end points.

End point 1010 can be, for example, a mobile end point, which includes mobile equipment (e.g., mobile phone) equipped with encryption modules. The encryption modules provide encryption and decryption functions for voice data in real time and establish a secure communication link with another end point in the communication system. The encryption modules can be processors embedded with computer readable instructions that when executed perform encryption and decryption functions.

End point 1010 includes trusted contact database 1015, which stores a list of trusted contacts (1 through n) (i.e. trusted end-points in the communication system), secure group databases 1075a and 1075b, which stores a list of secure groups and associated information and a database manager 1045.

Figure 2A:
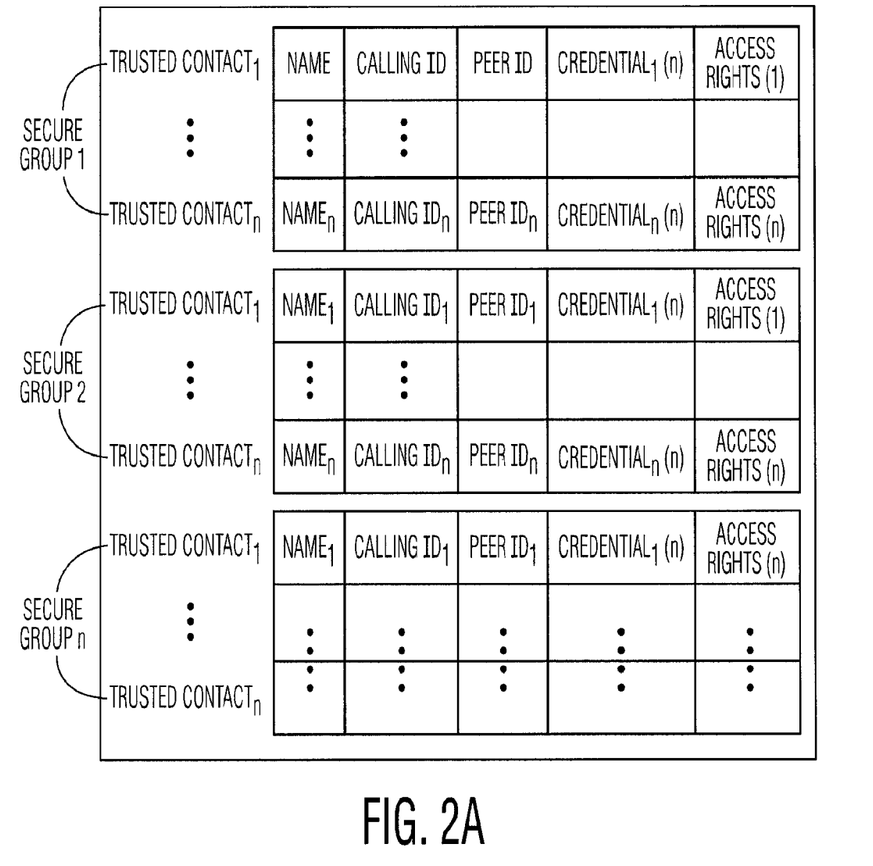
FIG. 2 is a block diagram illustrating an exemplary embodiment of a secure group database.

A secure group is a heterogeneous set of trusted contacts stored in secure group database 1075a, as illustrated in FIG. 2A. Each secure group contains a list of trusted contacts. Each trusted contact contains for a given end point: name, CallingID, PeerID, Credential1 and optionally Credential2 (not shown), and access rights. The name is a user-defined string to identify the contact. CallingID can be used as a CallerID or CalleeID, and CredentialZ is AAZpub, or Cert-AAZ, and Z corresponds to end point 1010, end point 1020, gateway 1030, or specific terminals or services in the PBX network to which the gateway 1030 connects.

Figure 2B:
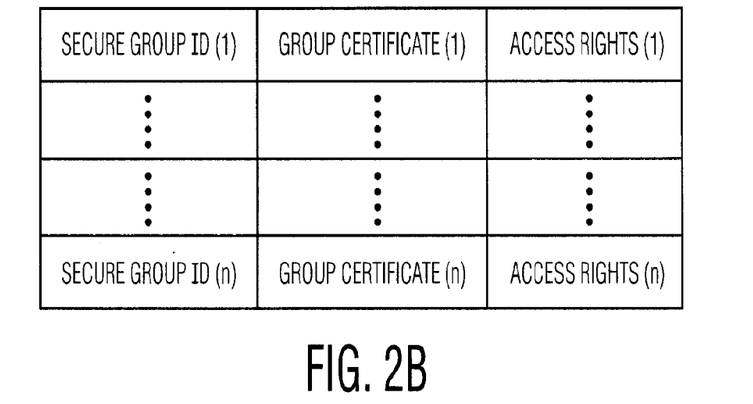

For each trusted contact access rights are stored which define a set of permissions associated with the corresponding trusted contact. For each secure group a group certificate and access rights are stored in secure group database 1075b. The secure group access rights define a set of permissions associated with all of the trusted contacts within a corresponding secure group, as illustrated in FIG. 2B.

The PeerID identifies the device to the media server and is generated using a random number generator. In another exemplary embodiment, the PeerID is derived from a public key of an asymmetric cryptographic key pair that an end point generates when it is created. The PeerID of an end point is independent of the IP address and is used to identify media messages from a corresponding end point in the communication system.

CallerID is the secure phone number by which the end point or gateway initiating a call is addressed in the network that carries encrypted calls. CalleeID is the secure phone number by which the end point or gateway receiving the call is addressed in the network that carries encrypted calls.

In another exemplary embodiment, CallerID and CalleeID are identified by a trusted range, which is a heterogeneous set of elements that can specify all secure phone numbers that start with a specified prefix and/or all secure phone numbers in a specified range.

AAZpub is the public key value of device Z. Cert-AAZ is the digital certificate associated with device Z and Z corresponds to end point 1010, end point 1020 or gateway 1030. The digital certificate can identify a device, person, an attribute of either (e.g. a CallingID, email address, PeerID) or the combination.

Access rights are a set of permissions. The trusted contact permissions might include the right to make or receive a secure call message, such as, email, SMS or IM, to see a phone number or other identifier, to access a voicemail box, or conference bridge and to transfer a call. For example, end point 1010 may have permission to send calls to an organization O coupled to gateway 1030. The access rights can apply only for a specified time interval, such as time of day or week and the access rights can have an associated trust level, which is a positive integer.

The secure group permissions might include, the right for any group member to make or receive calls, messages, emails SMS or IM. For example, end point 1010 and end point 1030 may each have as a trusted contact permission to send calls to organization O, and as a secure group (i.e., a secure group comprising end point 1010 and 1020) end points 1010 and 1020 may have permission to send calls to department D within organization O.

The trusted contact access rights and secure group access rights may include the same type of rights, but the value of those rights may be different. A right that applies uniformly to a set of end points (i.e., a secure group access right) is quicker to check and maintain than the equivalent rights associated directly with each end point in the set. Also, the secure group rights require less data in storage and transmission.

Each end point has an associated end point trust level, which is a positive integer. An end point with a higher trust level is assumed to be more trustworthy than one with a lower trust level. The trust level is optionally stored in the trusted contact database entry associated with the end point. The trust level can be set when the trusted contact is defined, either by the user on the end point, or in a central directory.

Access rights can optionally include a trust level. In particular, different access rights may apply for different trust levels. For example, an end point may have the right to call an end point with the same trust level, but not to call an end point with a higher trust level.

Before performing a function that involves another end point, an end point confirms that the trust level of the access right associated with the other end point is greater than or equal to that of the end point trust level. Otherwise it denies the function. When a trust level is defined for the trusted contact and its access rights, the level of the access right takes precedence.

Database manager 1045 includes one or more microprocessors, computer readable memory (e.g., read-only memory (ROM) and random access memory (RAM)), mechanisms and structures for performing I/O operations. Database manager can execute an operating system for command execution on the one or more microprocessors and an application program for controlling the operations of trusted contact database 1015. The application program can be developed using any suitable computer programming language, such as, for example, Java programming.

End point 1010 includes a storage device (not shown), which can be implemented with a variety of components or subsystems including, for example, a magnetic disk drive, an optical drive, flash memory, or any other devices capable of persistently storing information. The storage device stores the trusted contact database.

End point 1020 can be, for example, another mobile end point, such as end point 1010, or a gateway device, such as gateway 1030. End point 1020 includes a trusted contact database 1025, secure group databases 1085a and 1085b, and database manager 10055 as described above. Gateway 1030 connects a traditional phone system, such as, for example, Public Switched Telephone Network (PSTN) and Private Branch Exchange (PBX) to network system 1100. The gateway converts the PSTN or PBX telephone traffic into an IP format for transmission over an IP network.

Gateway 1030 is equipped with an encryption module to facilitate encryption and decryption functions. Transparent point-to-point encryption is provided between end point 1010 and end point 1020, and between end point 1010 and gateway 1030. Gateway 1030 includes a trusted contact database 1035, secure group databases 1095a and 1095b, and database manager 1045 as described above.

The encryption modules may use redundant encryption schemes for session, authentication, digesting and/or key exchange. Preferred embodiments use two strong algorithms at the same time in series. The encryption of the data may be performed using any known cryptography algorithm, such as, for example, Elliptic curve Diffie-Hellman (ECDH), Rivest, Shamir and Adleman (RSA), Advanced Encryption Standard (AES), Digital Signature Algorithm (DSA), etc.

In an exemplary embodiment, trusted contacts and secure groups are stored in a central directory (e.g., Lightweight Directory Access Protocol (LDAP) or Microsoft Active Directory). The data is mastered there and distributed using standard means to end points. The data can be associated with other data elements associated with the end point and/or end point user.

Networks 1000 and 1200 are wireless network systems, such as, for example, Global Systems for Mobile Communication (GSM), Enhanced Data Rates for GSM Evolution (EDGE), General Packet Radio Service (GPRS), 3G GSM, HSPA, UMTS, CDMA and Wi-Fi.

Network system 1100 is a wired network system, such as, for example, an Internet Protocol (IP) system. The network system may include one or more signaling servers and one or more media servers. An end point sends a request to the signaling server to make a call or send a message to another end point. The signaling server sets up the call, telling each end point to contact the same media server. The end points send the real-time data to each other through the media server. The media server uses media protocols for receiving voice data and sending it across the network.

Storage device 1140 can be implemented with a variety of components or subsystems including, for example, a magnetic disk drive, an optical drive, flash memory, or any other devices capable of persistently storing information. Storage device 1140 includes device database 1125, which contains a list of all the DeviceIDs known to the system.

The architecture shown in FIG. 1 allows for communication (e.g., data transmission, phone call, and video) between two end points or between an end point and a gateway in the system. The real-time communications between two end points or between an end point and a gateway are encrypted using one or more session keys that are derived from a shared secret known only to the end points.

However, before any secure communication is performed between end points or an end point and a gateway, the system determines whether the requestor is a trusted contact or a member of a secure group, and the associated access rights are checked to determine whether the access requested is permissible.

Secure groups are established by a user on an end point or using a group service. The user of an end point may compile a secure group database by performing the following:

For each secure group,
1) Ask the user to input the names of the contacts associated with the secure group;
2) The end point verifies whether each contact is listed in the trusted contact database;
3) If so, the certificate of each trusted contact is verified, and the contact is added to the secure group.
4) If all certificates verify successful, the secure group is established. Optionally, the end point can sign the secure group with its private key thereby creating an associated group certificate for the group to show authenticity of origin. However, this may not be necessary if the secure group never leaves the end point. The secure group information is stored in the secure group databases.

In another exemplary embodiment, after verifying a certificate of a trusted contact, the end point replaces the certificate stored in the trusted contact with the corresponding PublicKey from the trusted contact, for example, Name, CallingID, PeerID, Certificate1, Certificate2 is replaced with Name, CallingID, PeerID, PublicKey1, PublicKey2

By this process, users of the secure group do not need thereafter to verify the associated certificate for each trusted contact.

Once the secure group is defined and a request to add a new contact to the defined secure group is received, the end point verifies that the contact is a trusted contact and validates the certificate of the trusted contact. When a contact does not have an associated certificate, trust is established using 'trust at first use' (TOFU). With TOFU, after the first call to or from a previously untrusted end point, the user's end point asks the user whether they want to trust the new contact. The user will generally decide whether to trust this new contact through an out-of-band process, which may include use of the authentication code. If the user decides to trust the end point, the user's end point creates a trusted contact, which contains the public key (but has no certificate). Such a trusted contact can then be a legitimate member of a secure group.

When a secure group is defined, or at any time during its lifetime, the associated access rights can be defined:
a. From a default set of access rights that are stored on the end point or mastered in the central directory;
b. By asking the user of an end point to specify which rights may apply when defining or editing the secure group; or
c. By a group service who defines and manages the secure groups in a central database.

Alternatively, a group service can be used to establish the secure groups. A group service is a central administrator, (i.e., an entity separate from the end point and comprised of hardware and software), which defines and manages the secure groups in a central database. The group service distributes the established secure groups to one or more end points in the communication system, using any standard mechanism such as, for example, Active Directory or Lightweight Directory Access Protocol (LDAP).

In an exemplary embodiment of the present disclosure, the communication system includes one or more group services, each of which operates independently to define and manage secure groups in the communications system.

Secure groups are established when the group service compiles a list of secure groups in a central directory, which are later distributed to a set of end points.

For each secure group,
1. The group service lists the names of the contacts
2. The group service verifies whether the contacts are listed in the central trusted contact database.
3. The group service validates the certificates of the trusted contacts.
4. The group service defines and adds the access rights for the group.
5. The group service stores the secure group in the central secure group databases.

The group service validates the certificates of each trusted contact in a secure group using standard mechanisms, such as, for example, traversing the certificate chain and/or online certificate status protocol (OCSP).

The group service can change an access right associated with a secure group in the central secure group databases.

In another exemplary embodiment, the group service can prevent a user from changing access rights associated with a secure group.

In another exemplary embodiment, a user can change an access right associated with a secure group.

Once the secure groups are defined, new contacts are added to a secure group by performing the following,
1. The group service verifies whether the contacts are listed in the central trusted contact database;
2. The group service validates the certificates of the trusted contacts;
3. The group service adds the trusted contact to the secure group (optionally changing the contact's certificate to the public key);
4. The group service signs the secure group with its GroupPrivateKey.

In another exemplary embodiment, the secure group contains a signature under a GroupPrivateKey, which has a group certificate and is associated with the group service. The group certificate can be, for example, a standard X.509 digital certificate. During the signing process the group service verifies all certificates in the secure group, and a trusted contact is only added to the secure group if all associated certificates validate. When creating or changing a secure group, the group service signs the secure group with its GroupPrivateKey (i.e., the signing process), to allow dependent parties to validate integrity of origin of the secure group. This signature also implicitly indicates that the group service has validated the secure contacts in the secure group.

In another exemplary embodiment, after verifying a certificate of a trusted contact, the group service replaces the certificate in the secure group database with the corresponding PublicKey, for example, Name, CallingID, PeerID, Certificate1, Certificate2, is replaced with Name, CallingID, PeerID, PublicKey1, PublicKey2

By this process, users of the secure group do not need thereafter to verify the associated certificate for each trusted contact. Thus, end points that use the secure contact (in the secure group) can trust the secure contact by virtue of trusting the secure group, rather than through having to validate each secure contact separately (through its certificate chain), potentially each time that secure contact is used, for example, to make or receive a call. This results in a very significant reduction of processing and communication load on the system.

The group service is able to distribute the secure groups frequently to an end point and has an associated group certificate that has a short lifetime at least as long as the time taken to redistribute all trusted contacts to the end points. In particular, there need be no relationship between the lifetime of the original certificates and that of a secure group. Thus, the end point does not need to check a Certificate Revocation List (CRL) lists or use Online Certificate Status Protocol (OCSP) when loading a secure group from the group service.

A CRL contains a record for each revoked certificate issued by the associated certificate authority. The certificate authority reissues a CRL periodically to keep it up-to-date. A trusting party (e.g., an end point) must check all the current CRL while validating each certificate. When validating each certificate, a trusting party must validate the certificate chain back to the certificate authority (CA), and check the 'liveness' (e.g. whether the certificate has been revoked) of the certificate either using OSCP or checking the CRLs of the associated CAs.

When the lifetime of a certificate is long compared with the churn rate of entities to which the certificate refers, the CRL tends to grow significantly, since typically the number of issued certificates exceeds, by a significant factor, the number of issued and still valid certificates. The effort of the trusting party checking all entries in a CRL then dominates the certificate validation process.

The CRL could refer to the certificate on a secure group, thereby reducing the number of CRL that would need to be checked if the CRL were to refer to all the members of the group. A CRL could be associated with a secure group, so it need consider only a sub-set of the issued certificates, generally making it smaller.

OCSP allows a trusting party end point to check the validity of a certificate that is associated directly with an end point and that is associated with a GroupSigningKey, with a $3^{rd}$ party service each time it seeks to validate a certificate. This places an additional computational and communications load on the end point, compared with not using OCSP.

The trusting end point could periodically check the secure group certificate using the OCSP group service, which would validate that all the entries in the secure group are still valid, thereby cutting down the OCSP load.

When an end point loads a secure group from the group service, it verifies the group certificate against its certificate chain, starting with the group service certificate and rooted in a public key held on the end point. The end point verifies the group certificate by standard mechanisms, such as, for example, OCSP and chain of trust/CRL. The end point only loads the secure group if the certificate verifies. This process ensures that the secure group has integrity of origin from the group service.

When loading the verified secure group, the end point extracts each trusted contact from the set in the secure group and adds it to the trusted contact database. The end point overwrites an existing trusted contact with that same CallingID and PeerID. The end point will ask the user whether to overwrite an existing trusted contact with the same CallingID (PeerID) but different PeerID (CallingID).

The group service, e.g., a group service A, may load a verified secure group from another group service, e.g., a group service B. For example, if a secure group is received by group service A from group service B, group service A must verify the secure group to confirm the integrity of origin from group service B (i.e., against B's GroupSigningKey and associated certificate). Group service A will then resign (and optionally re-validate the secure group) the secure group so that its contents can be trusted by end points in group service A's organization (who generally will not have a direct trust relationship with group service B's CA). When loading the verified secure group, the group service extracts each trusted contact from the set in the secure group and uses the data to build other secure groups. In this way, a group service can act as a trust broker for other group services.

In particular, an end point that trusts one group service need not trust others. An end point associated with a group service, will have access to the group service's certificate, through which it can trust signatures made by that group service. For example, one trusted group service might be associated with one organization, and another trusted group service with another organization. Each trusted group service can independently establish the trust in the secure groups that it administers.

Trusted contacts that are associated with one PKI can be used by end points that trust another group service. Also, trusted contacts can be constructed that do not trust a PKI but trust their group service.

Figure 3:
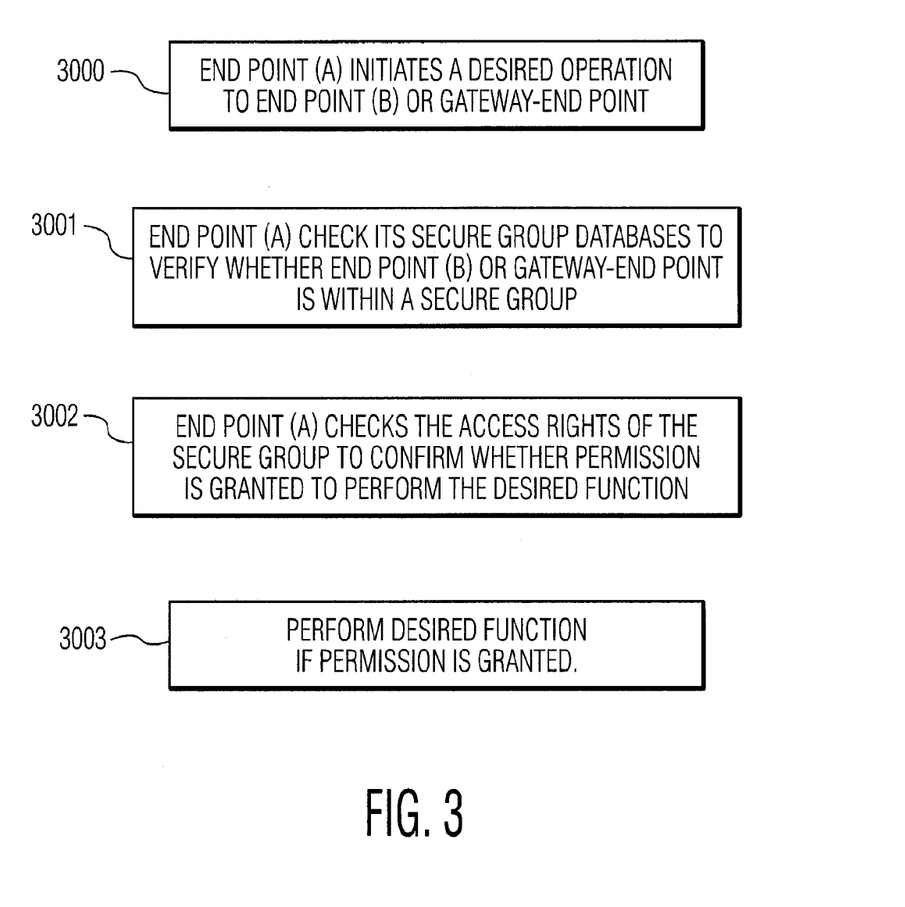
FIG. 3 is a flow chart illustrating an exemplary representation of using access rights in the secure group database to control data communications.

Once the secure group databases are established, communications between end points or between an end point and gateway are performed as illustrated in FIG. 3. At step 3000 an end point/gateway (e.g. end point 1010) initiates a desired operation (e.g., a call) to another end point (e.g. end point 1020). End point 1010 initiates the desired operation by sending the name associated with the end point/gateway and the desired operation to the database manager (e.g. database manager 1045).

At step 3001, database manager checks the database (e.g. database 1075a) to verify whether the name associated with the end point/gateway is in a secure group. Since only secure groups are listed in the secure group database 1075a, the database manager determines if the name is listed in the database, and if it is not, then the associated end point/gateway is not in a secure group and communication is not allowed.

If the end point is in a secure group, the database manager confirms whether permission is granted to perform the desired operation, at step 3002. The database manager checks the access rights associated with the secure group to determine if the desired operation is allowable, and if the desired operation is not allowed, communication of the sort desired is prevented. When there is a conflict between a trusted contact access right and a secure group access right, the trusted contact access right takes precedence.

If the desired operation is allowed, the operation is performed at step 3003.

As disclosed herein, embodiments and features of the invention can be implemented through computer hardware and/or software. Such embodiments can be implemented in various environments, such as networked and computing-based environments. The present invention is not limited to such examples, and embodiments of the invention can be implemented with other platforms and in other environments.

Moreover, while illustrative embodiments of the invention have been described herein, further embodiments can include equivalent elements, modifications, omissions, combinations (e.g., of aspects across various embodiments) adaptations and/or alterations as would be appreciated by those skilled in the art based on the present disclosure.

What is claimed:

1. A communications apparatus, comprising:
   an end point for receiving a request to make or receive a secure call, wherein data transmitted or received in said secure call is encrypted, said end point including:
   a trusted contacts database for storing a list of a plurality of trusted contacts in a memory device, wherein each of said trusted contacts are communication end points which are permitted to transmit or receive said secure call with said encrypted data;
a secure group database which includes:
  a) at least one secure group, said secure group includes said list of said plurality of trusted contacts and associated public keys stored in the memory device, the associated public keys replacing certificates of the trusted contacts in the secure group database upon group verification of the trusted contacts, and
  b) common access rights associated in common with all of said trusted contacts in said secure group stored in the memory device; and
a microprocessor configured to implement:
  a database manager for:
    receiving a communication request from another end point,
    checking the secure group database to verify whether the other end point is one of the trusted contacts in the at least one secure group, by determining if the other end point is associated with the public keys in the secure group database as a result of the group verification,
    allowing communication between the end point and the other end point when the other end point is one of the trusted contacts in the at least one secure group in response to determining that the other end point is associated with the public keys in the secure group database as a result of the group verification, and
    preventing communication between the end point and the other end point when the other end point is not one of the trusted contacts in the at least one secure group in response to determining that the other end point is not associated with the public keys in the secure group database as a result of the group verification,
  an encryption/decryption module for encrypting/decrypting said data with one of said trusted contacts based on said common access rights.

2. A communications apparatus according to claim 1, wherein said common access rights in said secure group database are a set of permissions associated with said secure group for any of said plurality of trusted contacts to transmit or receive encrypted data.

3. A communications apparatus according to claim 1, wherein each of said trusted contacts in said trusted contacts database have respectively different access rights and each of said trusted contacts in said secure group database have the same access rights.

4. A communications apparatus according to claim 1, further comprising a signaling server which includes a microprocessor and which receives a request to transfer encrypted data between any of said contacts and another end point or a gateway wherein said data is transferred after confirming said common access rights.

5. A communications apparatus according to claim 4, wherein said signaling server approves the request to transfer encrypted data by confirming the access rights in the secure group database without confirming the access rights in the trusted contacts database.

6. A communications apparatus according to claim 5, wherein said signaling server, confirms that said another end point has a trust level greater than or equal to a trust level of the trusted contact stored in the secure group database and making the request to transfer said encrypted data before permitting transferring of said data.

7. A communications apparatus according to claim 4, wherein said signaling server, confirms that said another end point has a trust level greater than or equal to a trust level of the trusted contact stored in the secure group database and making the request to transfer said encrypted data before permitting transferring of said data.

8. A method of performing communications, comprising the steps of:
  receiving, by a database manager of an end point, a request to make a secure call to another end point or receive a secure call from the other end point, wherein data transmitted or received in said secure call is encrypted;
  maintaining a trusted contacts database of trusted contacts, wherein each of said trusted contacts are communication end points which are permitted to transmit or receive said secure call with said encrypted data;
  maintaining a secure group database which includes:
    a) at least one secure group, said secure group includes said plurality of trusted contacts and associated public keys, the associated public keys replacing certificates of the trusted contacts in the secure group database upon group verification of the trusted contacts, and
    b) common access rights associated in common with all of said trusted contacts in said secure group;
  checking, by the database manager, the secure group database to verify whether the other end point is one of the trusted contacts in the at least one secure group by determining if the other end point is associated with the public keys in the secure group database as a result of the group verification;
  allowing, by the database manager, communication between the end point and the other end point when the other end point is one of the trusted contacts in the at least one secure group in response to determining that the other end point is associated with the public keys in the secure group database as a result of the group verification;
  preventing, by the database manager, communication between the end point and the other end point when the other end point is not one of the trusted contacts in the at least one secure group in response to determining that the other end, point is not associated with the public keys in the secure group database as a result of the group verification; and
  encrypting or decrypting said data with one of said trusted contacts based on said common access rights.

9. A method according to claim 8, further comprising the step of receiving a request from a signaling server which includes a microprocessor and which receives a request to transfer encrypted data between any of said contacts and another end point or a gateway wherein said data is transferred after confirming said common access rights.

10. A method according to claim 9, wherein the request to transfer encrypted data is approved by confirming the access rights in the secure group database without confirming the access rights in the trusted contacts database.

11. A method of performing communications according to claim 8, further comprising the steps of:
  establishing, by the end point, the secure groups of trusted contacts;
  storing information, corresponding to the trusted contacts as the secure group in the secure group database of the end point; and
  wherein the information identifies the trusted contacts and their respective individual access rights within the secure group;

determining group access rights, by the end point, of the secure group and storing the group access rights in the database of the end point with the stored information corresponding to the secure group.

12. The method of claim 11, where the secure groups are alternatively established by a group service.

13. The method of claim 12, wherein the group service distributes the list of secure groups to end points in the communication system.

14. The method of claim 11, wherein the stored information includes a name, CallingID, PeerID, Credential1 and optionally Credential2 for each trusted contact within a secure group.

15. The method of claim 11, wherein each secure group is associated with a group certificate.

16. The method of claim 11, wherein each end point and gateway in the secure communication system includes a database of secure groups.

* * * * *